July 5, 1927.

F. D. MASON

COLLAPSIBLE DRUM

Filed July 7, 1926

INVENTOR.
FREEMAN D. MASON.
BY
ATTORNEY.

July 5, 1927.

F. D. MASON

COLLAPSIBLE DRUM

Filed July 7, 1926

INVENTOR.
Freeman D. Mason.
BY
ATTORNEY.

July 5, 1927.

F. D. MASON 1,634,951

COLLAPSIBLE DRUM

Filed July 7, 1926

INVENTOR.
FREEMAN D. MASON.

BY

ATTORNEY.

Patented July 5, 1927.

1,634,951

UNITED STATES PATENT OFFICE.

FREEMAN D. MASON, OF AKRON, OHIO, ASSIGNOR TO THE BRIDGEWATER MACHINE COMPANY, OF AKRON, OHIO, A CORPORATION OF OHIO.

COLLAPSIBLE DRUM.

Application filed July 7, 1926. Serial No. 120,991.

This invention relates to collapsible drums for use in the manufacture of tires by the flat band method.

The chief object of the invention is to provide a quick-operating, collapsing mechanism on flat band tire building drums for facilitating the removal of tire casings therefrom after they have been constructed thereon.

The foregoing and other objects are obtained by the construction illustrated in the accompanying drawings and described below. It is to be understood that the invention is not limited to the specific form thereof as shown and described.

Of the accompanying drawings.

Figure 1:
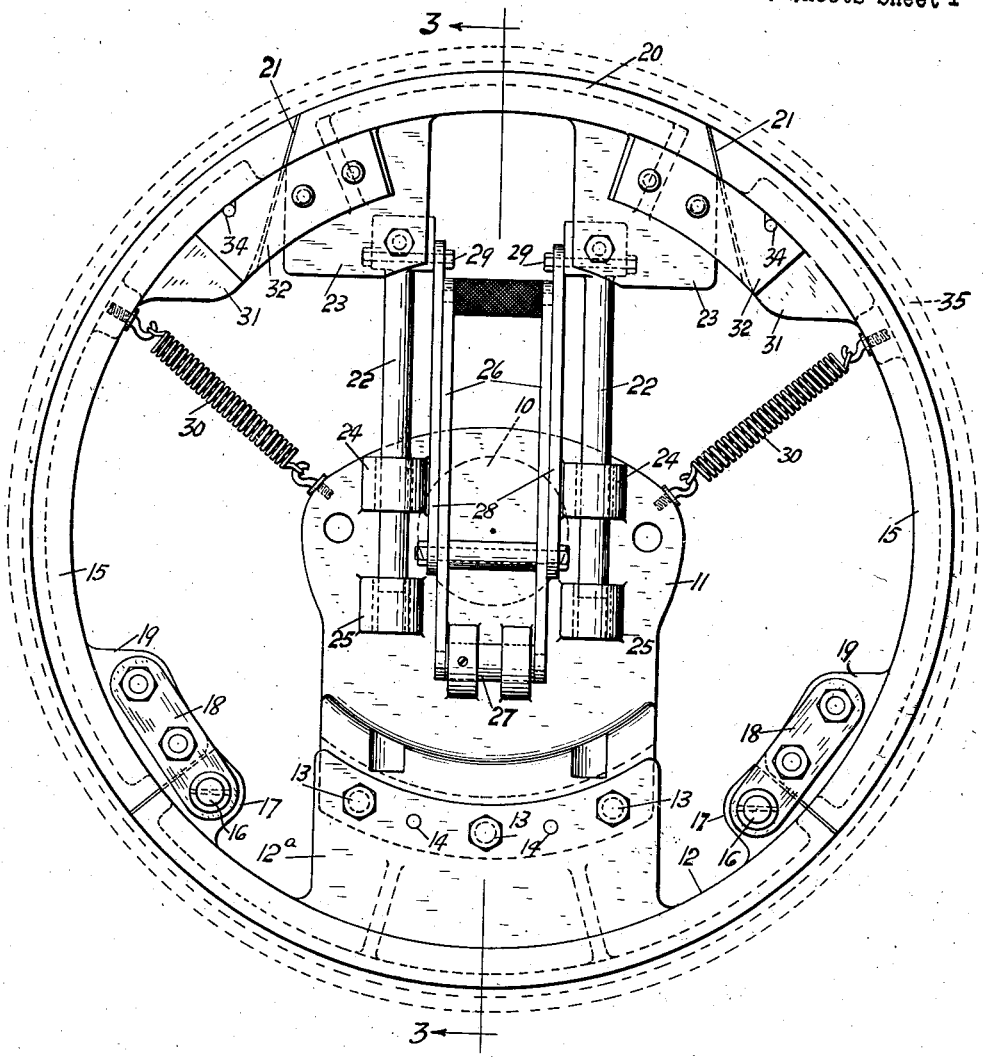
Figure 1 is a side elevation of a collapsible tire building drum embodying the invention.

Referring to the drawings, 10 indicates the shaft of a flat band tire builder, which shaft 10 has a chuck 11 secured thereon for supporting the drum sections and their operating mechanism. One drum section 12 is provided with a web 12$^a$ which is removably secured to chuck or supporting plate 11 by means of bolts 13, 13, dowels 14, 14 preferably being used to position said section properly thereon. Hinged onto the ends of section 12 are sections 15, 15, the pivots 16, 16 therefor being in lugs 17, 17, on the inner periphery of section 12 at its ends. The hinges comprise plates 18, 18 pivoted at 16 and bolted to lugs 19, 19 on the inner peripheries of sections 15 at the ends thereof adjacent section 12.

Arranged to complete the drum is a key section 20 movable inwardly from the drum circle to permit collapsing of sections 15, 15 inwardly therefrom. Section 20, accordingly, has inwardly diverging ends at 21, 21 and the adjacent ends of sections 15 are correspondingly formed to mate therewith.

To the end that key section 20 may be readily moved inwardly of the drum circle, it is arranged to slide on chuck 11 by having rods 22, 22 secured to lugs 23, 23 on the inner periphery of drum section 20 and slidable in bearings 24, 24 and 25, 25 on chuck 11. Means may be provided to move the section 20 inwardly, a suitable means for this purpose including a lever 26 pivoted on chuck 11 at 27 and having a link 28 hingedly connecting to said lever and to lugs 23 at 29, 29.

Figure 2:
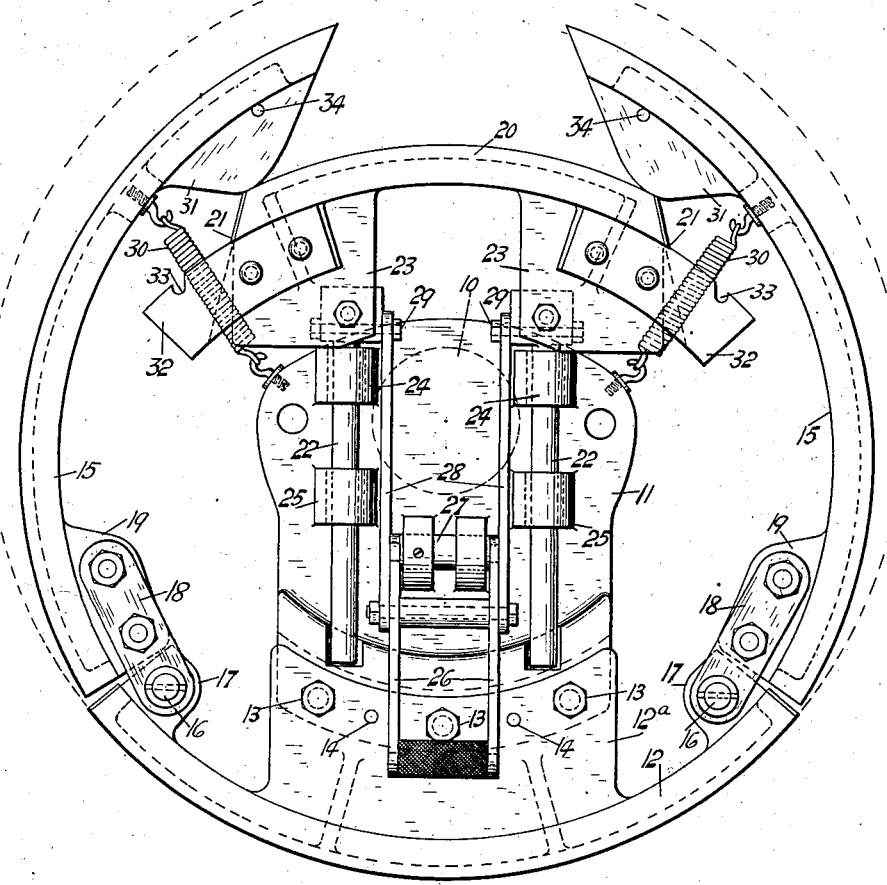
Figure 2 is a side elevation of the drum when collapsed.
Figure 3:
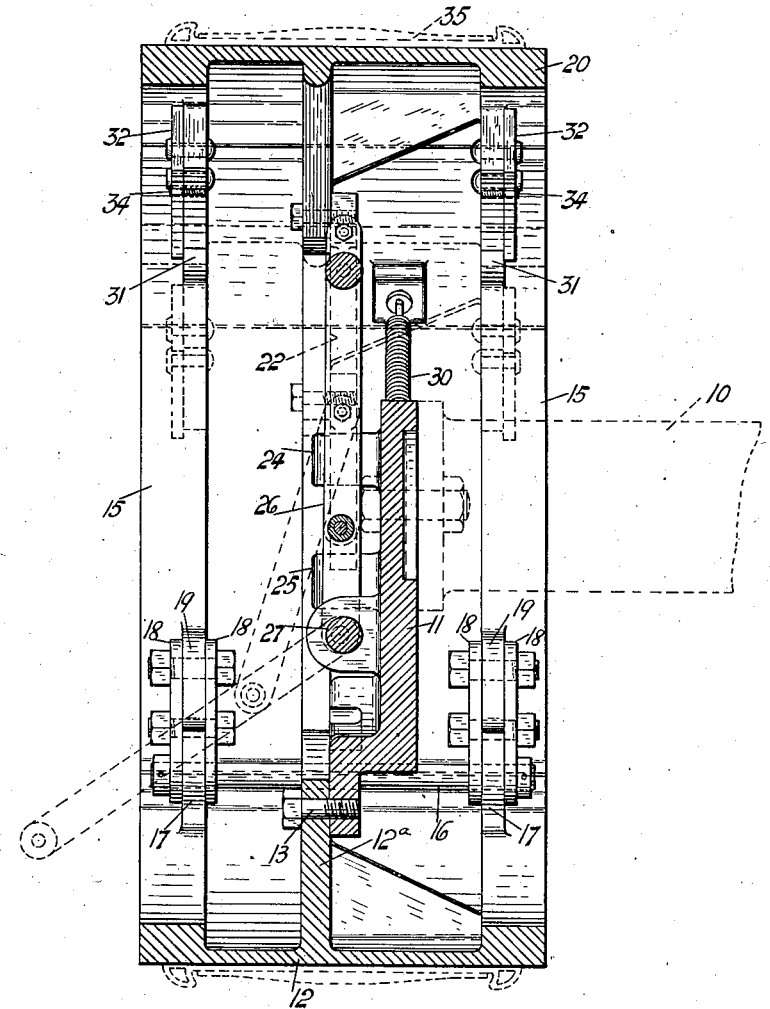
Figure 3 is a section on line 3—3 of Figure 1, the parts, in addition, being shown in dotted lines in their collapsed positions.

According to the preferred form of the invention, sections 15 are adapted to collapse automatically upon withdrawal of key section 20 from the drum circle by connecting said section to chuck 11 by means of tensile springs 30, 30, sections 15 having cams 31, 31 on their inner peripheries adjacent section 20 for riding on said section as it is moved to its collapsed position (Figure 2).

Secured on lugs 23, 23 of section 20 are latch plates 32, 32 projecting beyond the ends of said section and having slots 33, 33 therein arranged to engage pins 34, 34 secured on the free ends of sections 15 as the key section 20 is moved outwardly onto the drum circle to lock the drum sections together.

The operation of the drum will be readily understood from the foregoing description. The tire indicated at 35 is constructed thereon by the customary procedure. When the building of the tire is finished the lever 26 is swung downwardly to withdraw section 20 from the drum circle, as section 20 moves inwardly under the action of springs 30, cams 31 riding on the ends of section 20. The tire casing 35 may then be slipped off the drum. Lever 26 is now swung upwardly, thus urging key section 20 upwardly which, by action against cams 31, moves sections 15 outwardly against the action of springs 30 and finally, through latch plates 32 and pins 34, locks sections 15 in place in the drum circle.

By the construction disclosed herein, the actuation of a single means fully collapses the drum quickly and effectively. The removable mounting of the sections 12 and 20 on chuck 11 permit use of drums of different sizes with a single chuck and collapsing mechanism.

Modifications of this construction may be resorted to without departing from the spirit of the invention or the scope of the appended claims.

What is claimed is:

1. A collapsible drum construction for use in building tires by the flat band method, said construction including a chuck, a drum section removably secured on the chuck, drum sections hinged on the opposite ends of the first section, and a key section movably mounted on the chuck for operation between the free ends of the hinged sections, means on the chuck for moving the key section radially inwardly, and yielding means normally urging the free ends of the hinged sections inwardly, said hinged sections having cam surfaces thereon for riding on said key section.

2. A collapsible drum construction for use in building tires by the flat band method, said construction including a chuck, a drum section removably secured on the chuck, drum sections hinged on the opposite ends of the first section, and a key section movably mounted on the chuck for operation between the free ends of the hinged sections, means on the chuck for moving the key section radially inwardly, and yielding means normally urging the free ends of the hinged sections inwardly.

3. A collapsible tire building form, including a chuck, a form section rigidly connected thereto, a key section opposite to the first section and movably mounted on the chuck, sections intermediate the first section and the key section and hinged onto the former, means for moving the key section inwardly of the form circle, and yielding means normally tending to swing the hinged sections inwardly.

4. A cylindrical drum for use in the manufacture of tires by the flat band method, comprising a plurality of sections which form a complete cylinder, one of the sections being stationary, an inwardly projecting web on said section, a shaft centrally of the drum, a supporting plate on the shaft, means to secure the web to the supporting plate, swinging sections hinged to the ends of the stationary section, a key section opposite thereto, the key section being movable toward and from the shaft, and means to move the swinging sections upon the withdrawal of the key section.

5. A cylindrical drum for use in the manufacture of tires by the flat band method, comprising a plurality of sections which form a complete cylinder, one of the sections being stationary, an inwardly projecting web on said section, a shaft centrally of the drum, a supporting plate on the shaft, means to secure the web to the supporting plate, swinging sections hinged to the ends of the stationary section, a key section opposite thereto, mechanism mounted on the supporting plate adapted to move the key section toward and from the shaft, and means connecting a swinging section with the supporting plate and adapted to move the swinging section inwardly upon the withdrawal of the key section.

6. In a collapsible tire building form, a chuck, a plurality of form sections hinged together, a movable form section between the ends of two of said sections, means to move the form section toward and from the center of the form, and yielding means connected to one of the hinged sections and adapted to rock the hinged section as the movable section approaches the center of the form.

7. In a collapsible tire building form, a chuck, a form secured to the chuck, said form comprising a plurality of sections, one of which is movable toward and from the center of the form, a second section which is movable into overlapping relation to the first named section, a spring connected to the second section and acting to move the second section subsequently to the movement of the first named section, and a surface on the second section adapted to contact with the end of the first section.

FREEMAN D. MASON.